United States Patent [19]

Brewster

[11] Patent Number: 5,276,971
[45] Date of Patent: Jan. 11, 1994

[54] THREAD GAUGE FOR TAPERED THREADS

[76] Inventor: Albert L. Brewster, R.R. #2, Box 264, Pleasant Hill, Mo. 64080

[21] Appl. No.: 24,531

[22] Filed: Mar. 1, 1993

[51] Int. Cl.⁵ .................... G01B 3/40; G01B 3/48; G01B 3/56
[52] U.S. Cl. ..................... 33/199 R; 33/829
[58] Field of Search .. 33/199 R, 199 B, 531, 532, 829

[56] References Cited

U.S. PATENT DOCUMENTS

| | | | |
|---|---|---|---|
| 2,437,160 | 3/1948 | Johnson | 33/199 R |
| 2,911,725 | 11/1959 | Slogh | 33/199 R |
| 2,941,304 | 6/1960 | Man | 33/199 R |
| 3,044,178 | 7/1962 | Kasten et al. | 33/199 R |
| 3,296,705 | 1/1967 | Johnson | 33/199 R |
| 4,524,524 | 6/1985 | Frank et al. | 33/199 R |
| 4,536,964 | 8/1985 | Lazes | 33/199 R |
| 4,547,970 | 10/1985 | Brewster . | |
| 4,553,337 | 11/1985 | Brewster . | |
| 4,567,670 | 2/1986 | Roulstone | 33/199 R |
| 4,672,750 | 6/1987 | Storace et al. | 33/199 R |
| 4,947,555 | 8/1990 | Allen, III . | |
| 4,965,937 | 10/1990 | Hill | 33/199 R |
| 5,048,197 | 9/1991 | Anderson . | |
| 5,182,862 | 2/1993 | Frank et al. | 33/199 R |

Primary Examiner—Thomas B. Will
Attorney, Agent, or Firm—Hovey, Williams, Timmons & Collins

[57] ABSTRACT

The thread gauge permits the user to determine the pitch diameter of tapered threads at the intersection of the pitch cone and the end face of the object being measured. A pair of opposed anvils having lines of threads which match the configuration and taper of the threads on the part being measured are brought into meshing engagement with the threads on opposite sides of the part. The anvils are located linearly into their proper positions by stop fingers on the anvils that are brought into abutting engagement with the end face of the part. This places predetermined reference points of the pitch cone of the thread anvils in registration with corresponding points on the end face of the part being measured, resulting in an accurate determination of the pitch diameter at that location. The thread anvils can be arranged for measuring either internal or external threads.

24 Claims, 2 Drawing Sheets

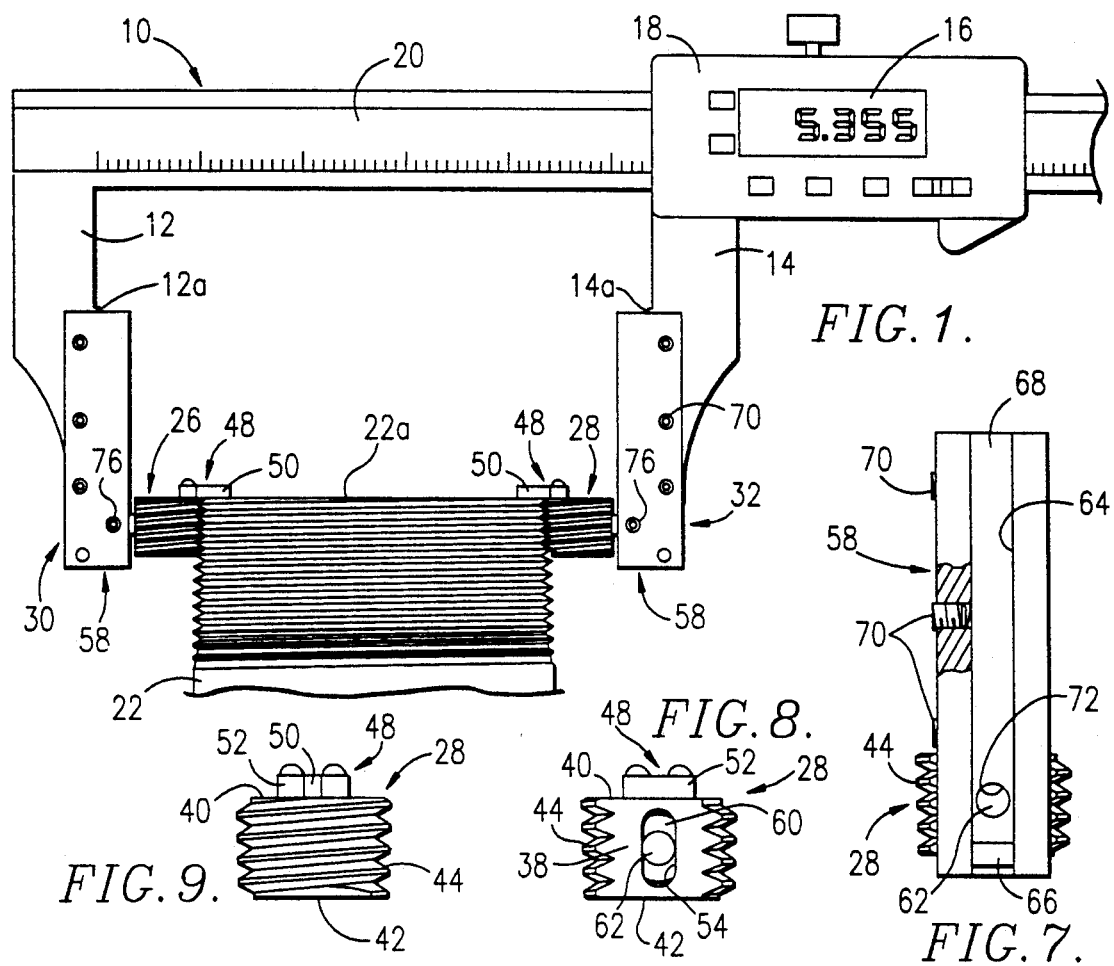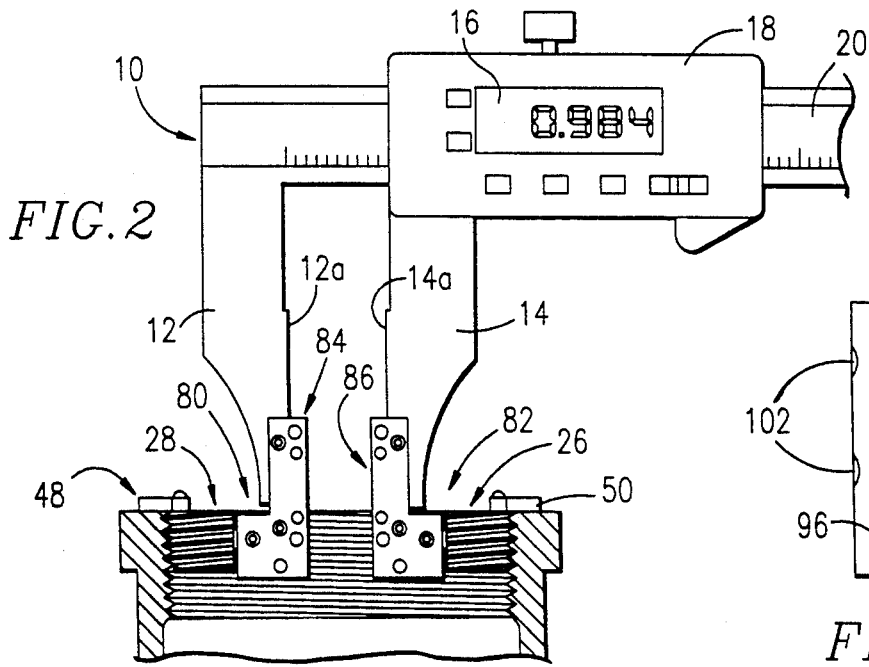

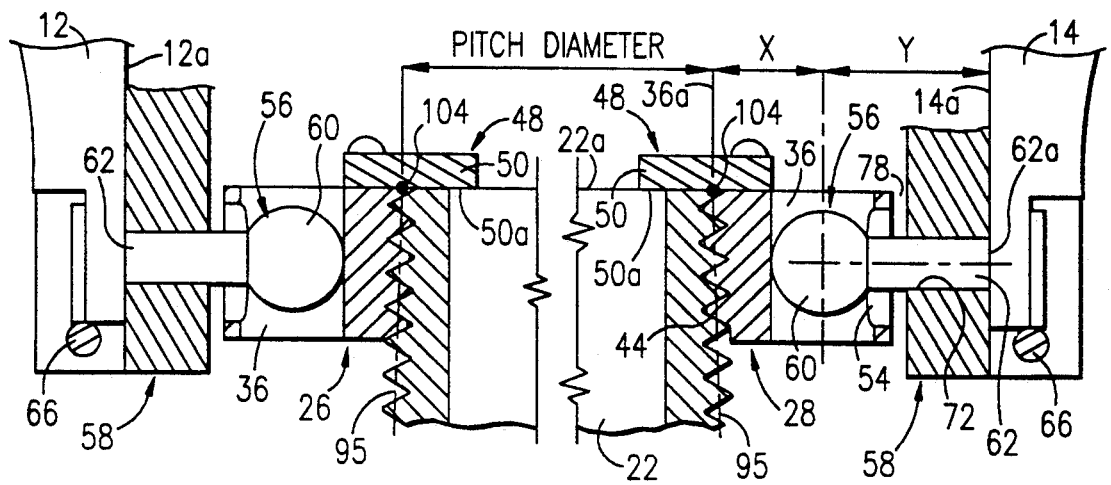
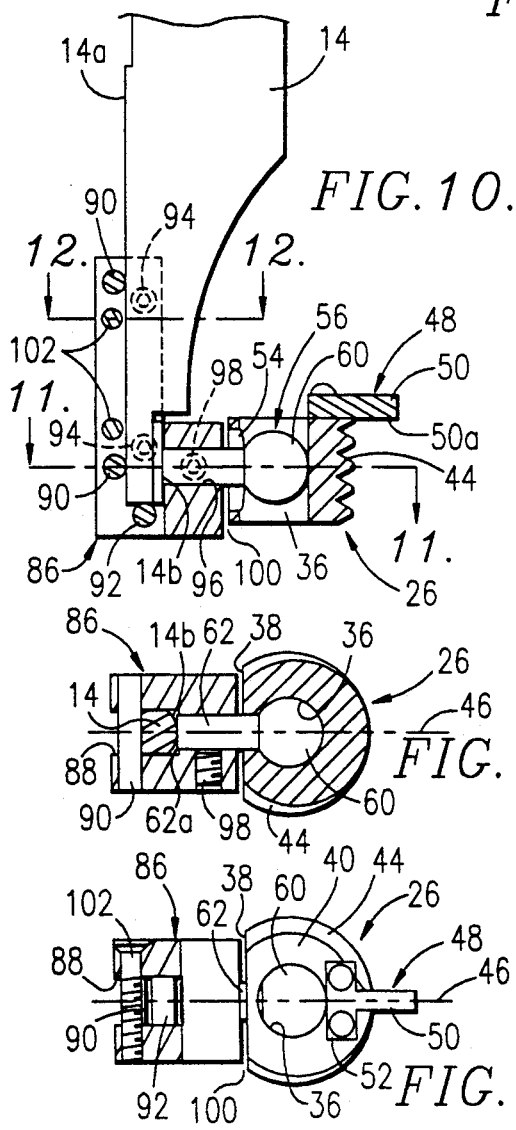
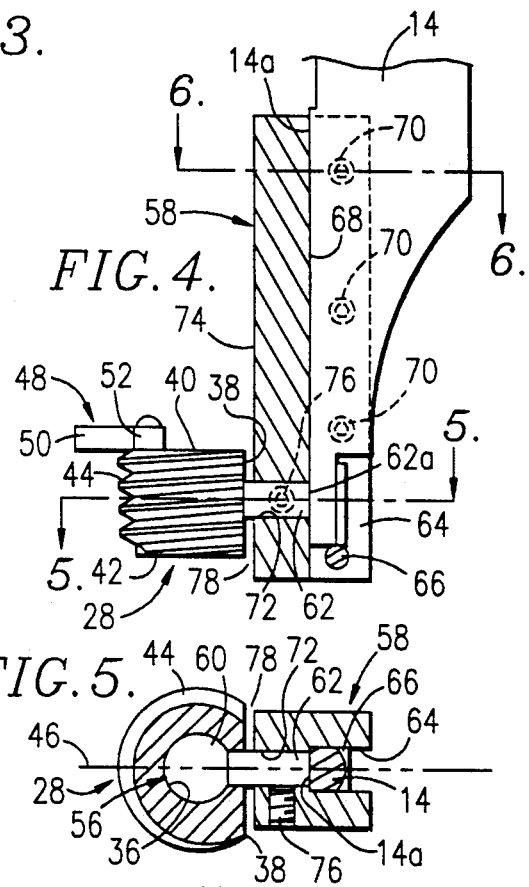

THREAD GAUGE FOR TAPERED THREADS

The Government has rights in this invention pursuant to Contract No. DE-AC04-76DP00613 awarded by the U.S. Department of Energy.

This invention relates to a thread gauge for measuring the pitch diameter of objects with tapered threads, such as tubing, pipes and other fluid conduits having interfitting threaded sections whose threads must be formed within acceptable tolerances to prevent leakage.

BACKGROUND

My prior U.S. Pat. Nos. 4,547,970 and 4,553,337 disclose and claim thread gauges for measuring the pitch diameter of cylindrical or non-tapered threads. While those gauges have proven to be extremely effective and useful for that particular type of thread configuration, they cannot be used with accuracy for parts or objects in which the pitch line of the threads forms a tapering cone instead of a straight cylinder.

Accordingly, one important object of the present invention is to provide a thread gauge which permits the user to accurately and conveniently measure the pitch diameter of an object having tapered threads. Furthermore, it is an important object to be able to measure such tapered threads whether they are on the outside or inside the object being checked.

Additionally, an important object of the present invention is to provide a thread gauge for tapered threads which carries on the general principles of use and operation provided in my earlier patents as above identified.

Still further, it is an important object of this invention to provide a tapered thread gauge which is particularly well suited for use in connection with a conventional vernier caliper, but which can also be utilized in connection with an inside micrometer without departing from the principles of operation and construction herein set forth.

In carrying out the foregoing and other objects, the present invention contemplates using a pair of thread anvils, as in my prior patents, which match the thread pitch and configuration of the part being measured. Such anvils are attached to the spreadable arms or supports of a vernier caliper, or to the opposite ends of an inside micrometer, to essentially adapt that device to take an accurate measurement of the threads on the object to be measured. The problem with measuring threads of a tapered configuration is that the pitch diameter is constantly changing over the length of the threaded portion of the object, due to its conical shape. While with straight cylinder threads it makes no difference where the measurement is taken along the length of the threaded portion, in a tapered configuration the linear point at which the measurement is taken is of critical importance.

Standard protocol requires that the pitch diameter of a tapered thread be called out at the intersection of the thread pitch cone and the end face of the object being measured. Due to the helical nature of threads, however, the exposed end face of the thread is set back or recessed away from the actual end surface of the object by a significant distance at a point that is 180° around the rim from the starting point of the thread. Consequently, there are no two diametrically opposed physical points exactly in the same plane at the end of the object that can be engaged by a measuring tool to determine the pitch diameter.

In the gauge of the present invention, by designing the thread anvils so their lines of threads are caused to taper or slope at the same angle as the tapered thread on the part to be measured, such anvils will mesh properly with the threads of the part when the anvils are applied to the part. Furthermore, since the thread anvils will, in effect, have their own tapering thread cone effectively defined between the two anvils, the intersection point between that pitch cone and the end face of the anvils can be precisely located at known distances from reference surfaces on the gauge. Consequently, by then registering those pitch cone intersection points of the thread anvils with the corresponding conical intersection points of the part to be measured, the intersection points on the part will likewise come to be located at the known distances from the reference surfaces of the tool. When these known distances are then added to or subtracted from the displayed distance reading on the measuring tool for the space between its reference surfaces, the resulting figure is the distance between the two diametrically opposed cone intersection points on the part, i.e., the pitch diameter of the part.

To make sure that the thread anvils of the present invention become located on the tapered thread of the object at the proper linear position, each of the anvils is provided with a special, overhanging stop finger that projects out beyond the thread line of the anvil into position to overlie the proximal end face of the object being measured. By abutting such end face, or nearly so, with the stop fingers, the imaginary cone intersection points on the thread anvils are forced into registration with the corresponding intersection points on the object being measured, to yield an accurate measurement.

In order to permit the two anvils on opposite sides of the object to be perfectly engaged with the threads on the object, it may be necessary for slight linear shifting or adjustment of the thread anvils to occur. Accordingly, the tapered thread anvils of the present invention are provided with ball couplings that join the anvils with the measuring tool itself in essentially the same manner as set forth in my prior '970 and '337 patents. Such ball couplings allow the anvils to shift linearly through a limited amount of travel as may be necessary to best seat the anvils on the object, while also permitting a certain amount of in-and-out rocking movement to likewise assure proper seating. It will be noted that this particular ball coupling arrangement also allows the anvils of the present invention to be interchangeably attached not only to vernier calipers, but also to inside micrometers, notwithstanding the constructional differences between those two types of tools.

By providing two different types of releasable connectors for coupling the mounting balls and their anvils to the leg supports of the caliper, the caliper may be set up for checking either externally threaded parts or internally parts, as the case may be. Notwithstanding this type of flexibility and adjustment, accurate measurements are assured.

BRIEF DESCRIPTION OF THE DRAWINGS

FIG. 1 is an elevational view of a conventional vernier caliper equipped with a tapered thread gauge constructed in accordance with the present invention and set up for measuring the pitch diameter of an externally threaded object;

FIG. 2 is an elevational view of the same vernier caliper using a slightly modified form of thread gauge of the present invention for checking the tapered pitch diameter of internally threaded objects;

FIG. 3 is an enlarged, fragmentary diagram illustrating the dimensional relationships between the tapered thread anvils and pitch diameter of the part being measured when external threads are involved;

FIG. 4 is an enlarged, fragmentary elevational view of the thread anvil and coupling means for one leg of the vernier caliper set up for measuring externally threaded parts;

FIG. 5 is a transverse, cross-sectional view thereof taken substantially along line 5—5 of FIG. 4;

FIG. 6 is a transverse, cross-sectional view through the caliper leg of FIG. 4 taken substantially along line 6—6 thereof;

FIG. 7 is a rear elevational view of the caliper leg of FIG. 4 with portions broken away to reveal details of construction;

FIG. 8 is an enlarged, elevational view of one of the thread anvils showing the flat inner face thereof and the clearance slot for the stem of the coupling ball;

FIG. 9 is an elevational view of the opposite side of the thread anvil showing the line of threads thereon;

FIG. 10 is a side elevational view of the caliper leg of FIG. 4 but set up for measuring the pitch diameter of an internally threaded part such as illustrated in FIG. 2;

FIG. 11 is a transverse, cross-sectional view thereof taken substantially along line 11—11 of FIG. 10;

FIG. 12 is another transverse, cross-sectional view of the anvil leg in FIG. 10 taken substantially along line 12—12 thereof; and FIG. 13 is a rear elevational view of one of the connectors for joining a thread anvil to the leg of the caliper when the measuring device is set up for internally threaded objects.

DETAILED DESCRIPTION

The measuring tool illustrated in FIG. 1 is a vernier caliper, which has been selected for purposes of illustration. However, it is to be understood, and will become apparent, that the thread gauge of the present invention can also be used quite readily with an inside micrometer of the type illustrated, for example, in my prior U.S. Pat. No. 4,547,970. Although the description will hereinafter proceed using the vernier caliper for illustrative purposes, it will be understood that the principles of the present invention may also be applied to other types of measuring tools including, but not limited to, inside micrometers as shown in my '970 patent.

The caliper 10 illustrated in FIG. 1 has a pair of relatively spreadable support arms 12 and 14 which are typically clamped around the object to be measured as in FIG. 1 or inserted into the open mouth of the object as in FIG. 2. Arm 12 is stationary, while arm 14 is moveable. The distance between reference surfaces 12a and 14a on the arms 12,14 is displayed digitally in a display window 16 associated with the carriage 18 which moves with the arm 14 along the graduated horizontal beam 20 of the caliper. The caliper 10 may take the form of a caliper sold by the Flex Bar Machine Corporation of Islandia, N.Y., under the trade designation "Digi-Met Electronic Caliper".

In order to adapt the caliper 10 for checking the pitch diameter of the tapered threads on the externally threaded object 22 in FIG. 1, the caliper 10 is provided with a thread gauge adapter assembly broadly denoted by the numeral 24. In its broadest respects, the assembly 24 includes a pair of specially equipped thread anvils 26 and 28, and respective couplings 30 and 32 that detachably secure the anvils 26 and 28 to the corresponding arms 12 and 14 of the caliper 10.

Dealing first with the anvils 26 and 28, it will be recognized that those components are very similar to one another, but not quite identical. The differences lie in the manner in which the thread lines of the respective components terminate, as will subsequently be seen, although the threads of the two parts are otherwise identical to one another.

Each of the anvils 26 and 28 can be described as comprising a generally cylindrical body having an axial bore 36 therethrough. The anvil body is not perfectly cylindrical but instead has a flat, normally upright rear face 38 along one extremity. The top and bottom faces 40 and 42 of the anvil are flat and are disposed in perpendicular relationship to the longitudinal axis of the bore 36. The exterior of each anvil is provided with a line of tapered threads 44 that correspond in pitch and in thread configuration to the threads on the part being measured. As shown most clearly in FIGS. 3 and 10, the line of threads 44 lies at an angle with the longitudinal axis of the bore 36, such angle corresponding to the angle of the tapered threads to be gauged. In practice, a number of different sets of the thread anvils 26 and 28 will be made available, each having a different thread pitch and thread configuration so that the appropriate thread pitch and configuration may be selected for the particular job at hand.

It is to be noted that the thread lines on the two anvils 26 and 28 are 180° out of phase with one another. Stated otherwise, as noted particularly in FIGS. 4–6 and 10-12, the threads 44 at a point directly opposite the flat rear face 38 intersect the top face 40 differently on the anvil 26 than on the anvil 28. In this respect note that a plane 46 bisecting the rear face 38 also bisects the bore 36 and intersects the thread line 44 directly opposite to the flat face 38. On the anvil 26, the threads 44 at the intersection with the top face 40 have their apex located at the intersection with the top face 40, while in the anvil 28 just the opposite is true, i.e, the root of the thread 44 intersects with the top surface 40 of the anvil 28 at the intersection of the bisector plane 46 with the thread line.

Each of the anvils 26,28 also is provided with a generally T-shaped stop finger 48 that is rigidly affixed to the top face 40. Each of the stop fingers 48 has an overhanging, outwardly projecting finger portion 50 whose longitudinal axis lies within the bisector plane 46 and which projects outwardly beyond the thread line 44 on the respective anvil 26 and 28. Each stop finger 48 also includes a transverse mounting bar portion 52 at the inner end of the finger 50 which is directly affixed to the top surface 40. As a result of this arrangement, the bottom surface 50a of the finger 50 is located in substantially the same horizontal plane as and is substantially flush with the top surface 40.

Each of the anvils 26,28 also has a longitudinal slot 54 (FIGS. 3, 8, and 10) in the rear face 38 which communicates the internal bore 36 with the exterior of the anvil. The slot 54 is centered on the bisector plane 46 and terminates at its longitudinally opposite ends a short distance from the top and bottom surfaces 40 and 42.

The couplings 30 and 32 are identical to one another and comprise two major components, i.e, a ball coupling such as the ball coupling 56 in FIGS. 3–6, and a connector for securing the ball coupling to the corresponding caliper arm, such as the connector 58 illustrated in FIGS. 1 and 3-6. Each ball coupling 56 includes a spherical ball 60 having a diameter that closely matches the diameter of the bore 36 such that although the ball 60 can slip axially relative to the bore 36, there is no lateral looseness or sloppiness. Each coupling 56 further includes a rigid stem 62 which is affixed to the ball 60 in radially outwardly extending relationship thereto. When the ball coupling 56 is assembled with the anvil 26 or 28, the stem 62 passes through the slot 54 and is moveable lengthwise within the latter but has a diameter closely matching the width of the slot 54 such that there is no lateral movement of the stem 62 within the slot 54.

Each connector 58 comprises a generally flat, rectangular piece that is generally U-shaped in transverse cross-section, as seen in FIGS. 5 and 6, due to the presence of a milled longitudinal key way 64 therein. The key way 64 is of such dimension as to matingly accept the corresponding caliper arm 12 or 14 as the case may be, and there is a transverse locating pin 66 near the bottom of the key way 64 which serves as a locating stop for the bottom of the arm 12 or 14 when the connector 58 is applied thereto. The innermost longitudinal surface 68 of the key way 64 is adapted to butt up against the reference surface 14a or 12a of the caliper arms 12,14 when the connectors 58 are installed. A series of transverse set screws 70 in the connector 58 may be tightened against the proximal side surface of the caliper arm 12 or 14 to hold the connector 58 in place.

Each connector 58 near its bottom end is provided with a normally horizontally disposed through hole which leads from a normally inwardly directed face 74 of the connector to the back wall of the key way 64. Such mounting hole 72 is substantially the same diameter as the stem 62 of the coupling ball 56 so as to permit snug yet sliding reception of the stem 62 within such hole 72. A transverse set screw 76 secures the stem 62 in its proper position within the mounting hole 72. In this respect it will be noted that the length of the stem 62 is such that when the anvil 26 or 28 is secured to the corresponding connector 58, the innermost flat end 62a of the stem 62 may bear flatly against the locating surface 14a or 12a of the arms 14,12, while leaving a small gap 78 between the face 74 of the connector 58 and the rear face 38 of the proximal anvil 26 or 28. This provides for a certain amount of rocking of the anvils 26,28 about the balls 60 without interfering with the connectors 58.

When using the anvils 26 and 28 for gauging internally threaded members such as illustrated in FIG. 2, slightly different couplings 80 and 82 are utilized to secure the anvils 26 and 28 to the caliper arms 12 and 14. In this respect, although the couplings 80 and 82 utilize the same ball couplings 56, as utilized in couplings 30 and 32 for external threads, two different connectors 84 and 86 are now utilized.

These two connectors 84 and 86 are identical to one another and are generally L-shaped in side elevation. A longitudinal key way 88 extends the full length of the long leg of each connector 84,86 to receive the lower end of the caliper arm 12 or 14 as illustrated in FIGS. 10-12. A pair of transverse dowel pins 90 at upper and lower ends of the key way 88 serve as back wall surfaces for engagement with the locating surface 12a or 14a of the caliper arms 12,14, While a third transverse dowel pin 92 across the bottom of the key way 88 serves as an abutting stop for the lower end of the caliper arms 12,14. Transverse set screws 94 secure the connectors 84,86 to the caliper arms 12,14. A horizontal through hole 96 in the horizontal leg of each connector 84,86 is adapted to receive the stem 62 of the corresponding coupling ball 56 and to allow the inner flat end 62a thereof to butt up against a short, upright reference surface 12b or 14b on the caliper arms 12,14. A transverse set screw 98 is disposed to bear against the stem 62 so as to releasably secure the coupling ball 56 in place. As in the previously described arrangement, the stem 62 is of such length as to present a clearance gap 100 between the rear face 38 of the anvil 26 or 28 and the connector 84 or 86 when the inner end 62a of the coupling ball is abutted against the reference surface 12b or 14b, whereby to permit rocking movement of the anvil 26 or 28 about the ball 60 to a limited extent. A pair of retaining screws 102 across the key way 88 adjacent the dowel pins 90 prevent untoward spreading of the opposite halves of the connector 84 or 86 when set screws 94 are tightened down against the caliper arm 12 or 14.

OPERATION

The manner of using the gauge of the present invention is illustrated in FIG. 3 in connection with an external thread. After the anvils 26 and 28 have been secured to the support arms 12 and 14 of the caliper 10, the anvils 26 and 28 essentially become a pair of open jaws that await the reception therebetween of the object to be measured. Once that object is moved into the space between the anvils 26 and 28, the caliper arms 12 and 14 can be shifted toward one another to bring the anvils 26,28 into meshing engagement with the threads of the object 22. It will be noted in this respect that although the anvils 26,28 could be brought into meshing engagement with the object 22 at any point along the threaded portion thereof, this would not assure an accurate measurement of the pitch diameter at the intersection of the pitch cone 95 of the object and its end face. On the other hand, by manipulating the caliper until the stop fingers 48 are down into engagement with the end face 22a of the object, or nearly so, measurement of the pitch cone 95 at its intersection with the end face 22a will be made, instead at some other linear position.

The reason that the finger stops 48 assure measurement of the pitch diameter at the end face 22a is due to the fact that the anvils 26 and 28 are constructed to cause known locations on their own pitch cone to register with the critical intersection points at the end face 22a of the object when the gauge is properly applied to the object. In this regard, it will be noted from FIG. 3 that when the gauge is properly set up and applied to the object, the centerline 36a of the bore 36 will be perfectly parallel with the reference surface 14a of the caliper arm as shown in FIG. 3. This is true because even though the threads of the object 22 are disposed at an angle to its centerline, the line of threads 44 of the anvil 28 are similarly inclined so that the anvil 28 remains squared up with the reference surface 14a. A point 104 on the bottom of the stop finger 48 and within the bisector plane 46 has been previously determined to be on the pitch line of the threads 44 of the anvil 28. Thus, the point 104 is a known distance X from the centerline 36a, which is in turn a known distance Y from the reference surface 14a. Therefore, as long as point 104 on the finger stop 48 is brought into registration with a corresponding point of intersection between the pitch cone 95 of the object 22 and its end face 22a, such point of intersection will likewise be located at the distance X+Y from the reference surface 14a.

The readout displayed in FIG. 1 of "5.355" comprises the distance between the two reference surfaces 12a and 14a. Consequently, in order to find the resulting pitch diameter of the object 22, it is only necessary to subtract two of the known "X" distances and two of the known "Y" distances from the number displayed (to account for the fact that the pitch cone 95 is set inwardly a distance of 2 X+2 Y from the reference surfaces 12a and 14a).

Sometimes it may be convenient after applying the anvils 26 and 28 to the threaded part to simply rotate the caliper around and literally screw it down toward the end of the part until the stop fingers 48 come into engagement with the end face, or nearly so. At other times, it may be sufficient to simply align the anvils 26 and 28 visually before clamping the caliper arms toward the object, in which event there will be very little rotation needed.

In any event, it will be noted that due to the inherent nature of helical threads, while a point on the pitch cone 95 might be physically present at the end face 22a near the anvil 28, there is no such physical point of intersection between the pitch cone 95 and the end face 22a on the opposite side of the object. Instead, the thread face has retreated back away from the end face 22a by a distance corresponding to one-half the pitch of the thread, thus providing no physical structure on the thread itself containing two diametrically opposed points within the same end plane. The bottom surfaces 50a of the stop fingers 48, however, provide such points within essentially the same end plane and thus enable the pitch diameter to be measured within the same end plane.

If it is desired to gauge the pitch diameter of an internal thread such as in FIG. 2, the procedure is quite similar to that explained above with respect to external threads. However, the connectors 84 and 86 are utilized instead of the connectors 58, so that the anvils 26 and 28 point outwardly rather than inwardly. Moreover, the coupling balls 56 locate off of the reference surfaces 12b and 14b, rather than the reference surfaces 12a and 14a.

Consequently, the readout of "0.984" as illustrated in FIG. 2 comprises the distance between reference surfaces 12a and 14a and must be added to by several values in order to yield the internal pitch diameter. As with the external diameter, the values for "X" and "Y" must be doubled, but now they must be added to the readout, not subtracted. Furthermore, a value for the combined distance between surfaces 12 and 12a and 14 and 14a must also be added to the readout value. In all other respects, measuring of the internal pitch diameter is the same as for the external threads.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

I claim:
1. A thread gauge tool for determining the pitch diameter of an object with tapered threads, wherein the pitch diameter is the distance between a pair of diametrically opposed points at the intersection of the imaginary pitch cone of the object and a proximal end face of the object, said gauge tool comprising:
   an extendable and retractable body having a pair of spaced supports that are adjustably movable toward and away from one another;
   a pair of thread anvils on opposite ones of said supports,
   each of said thread anvils having a series of threads thereon configured to complementally match the threads of the object to be measured,
   each of said thread series being arranged at an angle with respect to the longitudinal axis of the object being measured such that the thread series of the two anvils cooperatively define an imaginary tapered cone therebetween that registers with the imaginary pitch cone when the anvils are applied to the threaded object,
   said thread series having a pair of reference points at diametrically opposite portions of the imaginary cone that are located at determinable distances apart; and
   locating means associated with each of said anvils for causing said reference points of the anvils to correspondingly register with said intersection points on the object when the gauge is applied thereto whereby to yield the pitch diameter of the object when said distance between the reference points is determined.

2. A thread gauge tool as claimed in claim 1,
   said locating means comprising a stop on each anvil disposed to overlie the end face of the object when the gauge is applied thereto.

3. A thread gauge tool as claimed in claim 2,
   each of said anvils having a flat end surface adapted to be disposed in a substantially flush condition with said end face of the object when the gauge is applied thereto,
   said stop on each anvil comprising a rigid finger fixed to the anvil and projecting laterally outwardly therefrom in overhanging relationship to the threads on the anvil,
   said finger having a flat bottom surface located within substantially the same plane as the end surface of the anvil for maintaining the end surface of the anvil and the end face of the object in substantially flush relationship with one another during measurement.

4. A thread gauge tool as claimed in claim 3,
   each of said fingers being generally T-shaped, presenting a stabilizing crossbar at an inner end thereof.

5. A thread gauge tool as claimed in claim 1,
   each of said anvils being provided with means shiftably coupling the anvil to its corresponding support for adjustable shifting movement of the anvil relative to the support in an axial direction with respect to the longitudinal axis of the object being measured.

6. A thread gauge tool as claimed in claim 5,
   each of said shiftable coupling means including a rocking pivot which is operable to permit the anvil to adjustably rock inwardly and outwardly about an axis transverse to the longitudinal axis of the object being measured.

7. A thread gauge tool as claimed in claim 1,
each of said anvils including a longitudinal bore extending generally in the same linear direction as the series of threads of the anvil,
said bore having an elongated slot along a side thereof which is remote from the line of threads on the anvil,
each of said anvils being further provided with a coupling member comprising a ball and stem which projects radially outwardly from the ball,
said ball of the coupling member being confined within said bore and said stem of the coupling member projecting outwardly through and beyond said slot whereby to permit the anvil to be adjustably shifted axially relative to the longitudinal axis of the object being measured and rocked about an axis transverse to such longitudinal axis of the object being measured as necessary to properly seat the thread line of the anvil with the threads on the object being measured.

8. A thread gauge tool as claimed in claim 7,
said supports having a pair of oppositely facing reference surfaces,
said stem of each coupling member having an inner end adapted to abuttingly engage said reference surface of its corresponding support when the anvil for the support is attached thereto,
each of said anvils being further provided with a connector for detachably securing the corresponding anvil and coupling member to the support with said inner end of the stem of the coupling member abutted against said reference surface.

9. A thread gauge tool as claimed in claim 8,
said reference surfaces of the supports facing inwardly toward one another,
said connectors of the anvils being disposed to secure the anvils to the supports in such a manner that the anvils project inwardly toward one another for measuring the pitch diameter of an externally threaded object.

10. A thread gauge tool as claimed in claim 8,
said reference surfaces of the supports facing outwardly away from one another,
said connectors being disposed to secure the anvils to the supports in such a manner that the anvils project outwardly away from one another for measuring the pitch diameter of an internally threaded object.

11. A thread gauge tool as claimed in claim 1,
said anvils being provided with means for detachably coupling the anvils to the supports in such a manner that the anvils are positioned to generally face one another in mutually opposed relationship for measuring the pitch diameter of an externally threaded object.

12. A thread gauge tool as claimed in claim 1,
said anvils being provided with means for detachably coupling the anvils to the supports in such a manner that the anvils are positioned to generally face away from one another for measuring the pitch diameter of an internally threaded object.

13. A tapered thread gauge adaptor assembly attachable to the relatively moveable supports of a measuring device for adapting the device to determine the pitch diameter of an object with tapered threads, wherein the pitch diameter is the distance between a pair of diametrically opposed points at the intersection of the imaginary pitch cone of the object and a proximal end face of the object, said assembly comprising:
a pair of thread anvils;
means for detachably coupling said anvils with respective supports of the measuring device,
each of said thread anvils having a series of threads thereon configured to complementally match the threads of the object to be measured,
each of said thread series being arranged at an angle with respect to the longitudinal axis of the object being measured such that the thread series of the two anvils cooperatively define an imaginary tapered cone therebetween that registers with the imaginary pitch cone when the anvils are applied to the threaded object,
said threads having a pair of reference points at diametrically opposite portions of the imaginary cone that are located at determinable distances apart; and
locating means associated with each of said anvils for causing said reference points of the anvils to correspondingly register with said intersection points on the object when the measuring device is applied to the object, whereby to yield the pitch diameter of the object when said distance between the reference points is determined.

14. A tapered thread gauge adaptor assembly as claimed in claim 13,
said locating means comprising a stop on each anvil disposed to overlie the end face of the object when the measuring device is applied thereto.

15. A tapered thread gauge adaptor assembly as claimed in claim 14,
each of said anvils having a flat end surface adapted to be disposed in a substantially flush condition with said end face of the object when the measuring device is applied thereto,
said stop on each anvil comprising a rigid finger fixed to the anvil and projecting laterally outwardly therefrom in overhanging relationship to the threads on the anvil,
said finger having a flat bottom surface located within substantially the same plane as the end surface of the anvil for maintaining the end surface of the anvil and the end face of the object in substantially flush relationship with one another during measurement.

16. A tapered thread gauge adaptor assembly as claimed in claim 15,
each of said fingers being generally T-shaped, presenting a stabilizing crossbar at an inner end thereof.

17. A tapered thread gauge adaptor assembly as claimed in claim 13,
said detachable coupling means including means for permitting adjustable shifting movement of the anvil relative to its support in an axial direction with respect to the longitudinal axis of the object being measured.

18. A tapered thread gauge adaptor assembly as claimed in claim 17,
said means for permitting adjustable shifting movement including a rocking pivot which is operable to permit the anvil to adjustably rock inwardly and outwardly about an axis transverse to the longitudinal axis of the object being measured.

19. A tapered thread gauge adaptor assembly as claimed in claim 13, each of said anvils including a longitudinal bore extending generally in the same linear direction as the series of threads of the anvil, said bore having an elongated slot along a side thereof which is remote from the line of threads on the anvil, said detachable coupling means including a coupling member comprising a ball and stem which projects radially outwardly from the ball, said ball of the coupling member being confined within said bore and said stem of the coupling member projecting outwardly through and beyond said slot whereby to permit the anvil to be adjustably shifted axially relative to the longitudinal axis of the object being measured and rocked about an axis transverse to such longitudinal axis of the object being measured as necessary to properly seat the thread line of the anvil with the threads on the object being measured.

20. A tapered thread gauge adaptor assembly as claimed in claim 19, said supports having a pair of oppositely facing reference surfaces, said stem of each coupling member having an inner end adapted to abuttingly engage said reference surface of its corresponding support when the anvil for the support is attached thereto, said coupling means for each anvil including a connector for detachably securing the corresponding anvil and coupling member to the support with said inner end of the stem of the coupling member abutted against said reference surface.

21. A tapered thread gauge adaptor assembly as claimed in claim 20, said reference surfaces of the supports facing inwardly toward one another, said connectors of the anvils being disposed to secure the anvils to the supports in such a manner that the anvils project inwardly toward one another for measuring the pitch diameter of an externally threaded object.

22. A tapered thread gauge adaptor assembly as claimed in claim 20, said reference surfaces of the supports facing outwardly away from one another, said connectors being disposed to secure the anvils to the supports in such a manner that the anvils project outwardly away from one another for measuring the pitch diameter of an internally threaded object.

23. A tapered thread gauge adaptor assembly as claimed in claim 13, said coupling means being disposed to orient the anvils on the supports in such a manner that the anvils are positioned to generally face one another in mutually opposed relationship for measuring the pitch diameter of an externally threaded object.

24. A tapered thread gauge adaptor assembly as claimed in claim 13, said coupling means being disposed to orient the anvils on the supports in such a manner that the anvils are positioned to generally face away from one another for measuring the pitch diameter of an internally threaded object.

* * * * *